(12) United States Patent
Fujibayashi et al.

(10) Patent No.: US 8,557,472 B2
(45) Date of Patent: Oct. 15, 2013

(54) PROTON CONDUCTING POLYMER MEMBRANE, METHOD FOR PRODUCTION THEREOF AND FUEL CELL THEREWITH

(75) Inventors: Fusaki Fujibayashi, Yokohama (JP); Yoshimitsu Sakaguchi, Otsu (JP); Satoshi Takase, Otsu (JP)

(73) Assignee: Toyo Boseki Kabushiki Kaisha, Osaka-Shi (JP)

( * ) Notice: Subject to any disclaimer, the term of this patent is extended or adjusted under 35 U.S.C. 154(b) by 1104 days.

(21) Appl. No.: 11/921,455

(22) PCT Filed: May 31, 2006

(86) PCT No.: PCT/JP2006/310858
§ 371 (c)(1),
(2), (4) Date: May 5, 2008

(87) PCT Pub. No.: WO2006/129694
PCT Pub. Date: Dec. 7, 2006

(65) Prior Publication Data
US 2009/0136818 A1    May 28, 2009

(30) Foreign Application Priority Data

Jun. 3, 2005 (JP) .......................... 2005-163962 (P)
Jun. 3, 2005 (JP) .......................... 2005-163982 (P)

(51) Int. Cl.
*H01M 8/10* (2006.01)
(52) U.S. Cl.
USPC ........................... 429/491; 429/492; 429/493
(58) Field of Classification Search
USPC .......................................................... 429/33
See application file for complete search history.

(56) References Cited

U.S. PATENT DOCUMENTS

| | | | |
|---|---|---|---|
| 3,313,783 A | 4/1967 | Iwakura et al. | |
| 3,509,108 A | 4/1970 | Prince | |
| 2001/0038937 A1 | 11/2001 | Suzuki et al. | |
| 2004/0062969 A1 | 4/2004 | Sakaguchi et al. | |
| 2005/0031925 A1 | 2/2005 | Ofer et al. | |
| 2005/0084727 A1 | 4/2005 | Kiefer et al. | |
| 2005/0175879 A1* | 8/2005 | Kiefer et al. .................... | 429/33 |
| 2005/0249995 A1* | 11/2005 | Sugiura et al. .................. | 429/34 |
| 2006/0057449 A1* | 3/2006 | Calundann et al. ............. | 429/33 |

FOREIGN PATENT DOCUMENTS

| | | |
|---|---|---|
| CA | 2 477 864 A1 | 9/2003 |
| CA | 2485507 A1 | 11/2003 |
| JP | 9-110982 A | 4/1997 |
| JP | 11-503262 A | 3/1999 |
| JP | 2001-223015 A | 8/2001 |
| JP | 2003-229143 A | 8/2003 |
| JP | 2003-327694 A | 11/2003 |
| JP | 2003-327825 A | 11/2003 |
| JP | 2003-327826 A | 11/2003 |
| JP | 2003-327862 A | 11/2003 |
| JP | 2004-131530 A | 4/2004 |
| JP | 2004-131532 A | 4/2004 |
| JP | 2004-131533 A | 4/2004 |
| JP | 2005044611 A | 2/2005 |
| JP | 2005-68396 A | 3/2005 |
| WO | WO 96/13872 | 5/1996 |
| WO | WO 02/38650 A1 | 5/2002 |
| WO | WO 02/058205 A2 | 7/2002 |
| WO | WO 2004/003061 * | 6/2003 |

OTHER PUBLICATIONS

Qing et al. "Synthesis and Characterization of Thermally Stable Sulfonated Polybenzimidazoles," European Polymer Journal, vol. 41, Issue 7, Jul. 2005.*
Korean Patent Office, Office Action in related Korean patent application No. 10-2008-7000055, dated Feb. 15, 2011.
Powers, E.J., Serad, G.A.: *History and Development of Polybenzimidazoles*, in High Performance Polymers: Their Origin and Development, pp. 355-373, New York, Elsevier, 1986.
Wolfe, J.F.: *Polybenzothiazoles and Oxazoles*, in Encyclopedia of Polymer Science and Engineering, vol. 11, pp. 601-635, John Wiley & Sons, Inc., 1988.
Zbigniew Florjanczyk, "Polymeric Membranes for Direct Methanol Fuel Cells," Report No. AD-A-379118 dated Mar. 10, 2000.
Japan Patent Office, Notice of Grounds of Rejections, Mailed Dec. 6, 2011 in related Japanese application No. 2005-163982.
Japanese Patent Office, Notice of Grounds of Rejections in related Japanese application No. 2005-163982, mailed Jun. 19, 2012.

* cited by examiner

*Primary Examiner* — Ula C Ruddock
*Assistant Examiner* — Jacob Marks
(74) *Attorney, Agent, or Firm* — Kenyon & Kenyon LLP

(57) ABSTRACT

There are provided a novel proton-conducting polymer membrane that shows good workability in a fuel cell assembling process and good proton conductivity and durability even under high-temperature, non-humidified conditions, a method for production thereof, and a fuel cell therewith. The proton-conducting polymer membrane includes: a polymer membrane containing a polybenzimidazole compound having a sulfonic acid group and/or a phosphonic acid group; and vinylphosphonic acid contained in the polymer membrane. The fuel cell uses the proton-conducting polymer membrane. The polybenzimidazole compound preferably includes a sulfonic and/or phosphonic acid group-containing component represented by Structural Formula (1):

$$\left[\begin{array}{c} \mathrm{N} \diagdown \diagup \mathrm{N} \\ \mathrm{C} \diagup \mathrm{R}^1 \diagdown \mathrm{C} - \mathrm{R}^2 \\ \mathrm{N} \diagup \diagdown \mathrm{N} \\ \mathrm{H} \quad \mathrm{H} \quad (\mathrm{Z})_n \end{array}\right] \quad (1)$$

wherein n represents an integer of 1 to 4, $R^1$ represents a tetravalent aromatic linking unit capable of forming an imidazole ring, $R^2$ represents a bivalent aromatic linking unit, and Z represents a sulfonic acid group and/or a phosphonic acid group.

6 Claims, 2 Drawing Sheets

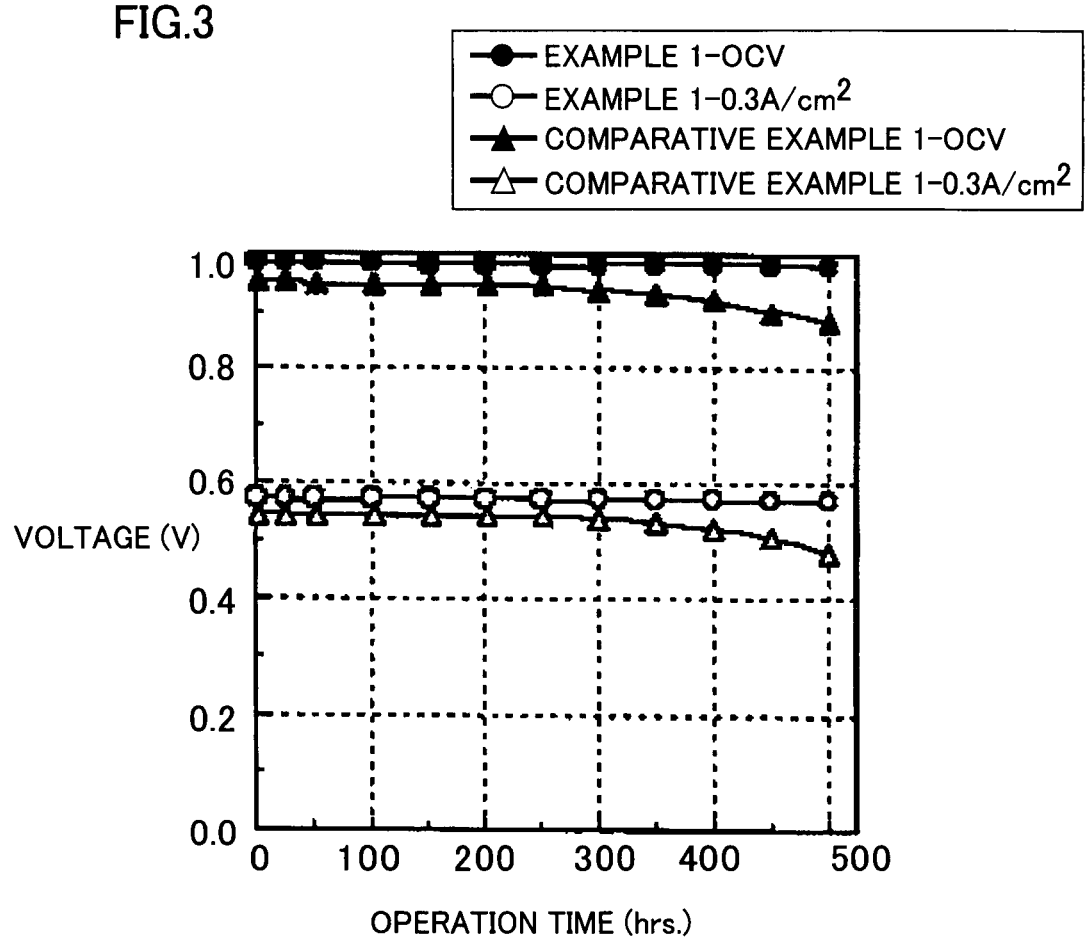

PROTON CONDUCTING POLYMER MEMBRANE, METHOD FOR PRODUCTION THEREOF AND FUEL CELL THEREWITH

This is a U.S. national phase application of PCT/JP2006/310858 filed 31 May 2006, which claims priority of Japanese Patent Applications No. 2005-163962 and No. 2005-163982, both filed 3 Jun. 2005, the contents of which are incorporated herein by reference.

TECHNICAL FIELD

The present invention relates to a proton-conducting polymer membrane that includes an acidic group-containing polybenzimidazole compound and an acidic compound as components and is a composition useful as a polymer electrolyte membrane operable under high-temperature, non-humidified conditions and also relates to a method for production thereof and a fuel cell therewith.

BACKGROUND ART

In recent years, solid polymer-type fuel cell membranes are attracting attention for new energy sources, and polymer membranes for use as cation exchange membranes in fuel cells are being developed. Such polymer membranes have to show good proton conductivity and to be sufficiently stable chemically, thermally, electrochemically, and mechanically. Therefore, perfluorocarbonsulfonic acid membranes, typified by Nafion® manufactured by DuPont (U.S.A.), have been generally used as long-life practical polymer membranes. In the case that perfluorocarbonsulfonic acid membranes are used, however, there is a problem in which the water content of the polymer membranes can rapidly decrease under fuel cell operation conditions at a temperature higher than 100° C., and the softening of the membranes can be significant, so that fuel cells cannot deliver sufficient performance.

In order to operate fuel cells in a high temperature range of at least 100° C., fuel cell membranes of highly heat-resistant polymers are basically required. Thus, a variety of polymer electrolyte membranes in which a sulfonic acid group is introduced in aromatic ring-containing polymers have been investigated. On the other hand, it is conceivable that an acidic group may be introduced into aromatic polyazole polymers, such as polybenzimidazole, known as highly heat-resistant, highly durable polymers, for use in the above-mentioned applications. There is a report on polymer electrolyte membranes of sulfonic or phosphonic acid group-containing polybenzimidazole polymers (for example, see the brochure of International Patent Publication WO02/38650 (Patent Document 1)). These polymers do not have very high proton conductivity at or near 80° C. but are expected to have conductivity at high temperature. However, the increase in proton conductivity tends to be not so significant, though the polymers having a structure in which a sulfonic acid group is introduced as an acidic group have good solubility in organic solvents and thus have good workability. On the other hand, the polymers having a structure in which a phosphonic acid group is introduced as an acidic group tend to have higher proton conductivity when the acidic group content is increased, but such proton conductivity cannot be practically sufficient. These polymers also require humidified conditions to exhibit proton conductivity, and, therefore, it should be impossible to use them at a temperature of at least 100° C. without humidification.

Only the introduction of an acidic group such as a sulfonic or phosphonic acid group into polymers cannot produce practical proton-conductivity in a high temperature range of at least 100° C. under non-humidified conditions. Thus, there is reported a high-temperature fuel cell electrolyte membrane that is produced by impregnating polybenzimidazole with phosphoric acid so that an ion-conducting function is produced with the phosphoric acid (for example, see Japanese Patent Application National Publication (Laying-Open) No. 11-503262 (Patent Document 2)). Polybenzimidazole should be a polymer with high thermal stability, and there is a report that impregnation with phosphoric acid can further increase the thermal stability (for example, see E. J. Powers et al., High Performance Polymers: Their Origin and Development, Elsevier, N.Y. (1986), p. 355 (Non-Patent Document 1)).

However, polybenzimidazole itself has no ion conductivity, and, therefore, polybenzimidazole has to be impregnated with a large amount of phosphoric acid in order to produce sufficient proton conductivity. There is also a problem in which phosphoric acid is a low-molecular weight compound and thus can gradually leak from polybenzimidazole so that the ion conductivity can decrease over time. There is also a problem in which high phosphoric acid content can increase membrane swelling to interfere with a fuel cell assembling process. The literature also discloses the use of a polybenzimidazole structure produced with a dicarboxylic acid monomer having a pyridine skeleton, in which, however, the tetramine monomer used at the same time is only 3,3'-diaminobenzidine so that the polymer produced with such a combination tends to have the same defect as described above.

In contrast, the polymer in which a sulfonic acid group is introduced in polybenzimidazole as described above has an acidic group in its molecule and thus is expected to produce proton conductivity even with low phosphoric acid impregnation amount. Therefore, sulfonic acid group-containing polybenzimidazole polymer electrolyte membranes impregnated with inorganic or organic acids are reported (for example, see Japanese Patent Laying-Open No. 2003-327826 (Patent Document 3)). At present, however, even these membranes cannot deliver satisfactory performance, such as workability and fuel cell membrane properties, practically necessary for fuel cells. In these investigations, pyridine skeleton-containing polymer structures have not been investigated yet.

Patent Document 1: International Patent Publication WO02/38650
Patent Document 2: Japanese Patent Application National Publication (Laying-Open) No. 11-503262
Patent Document 3: Japanese Patent Laying-Open No. 2003-327826
Non-Patent Document 1: E. J. Powers et al., High Performance Polymers: Their Origin and Development, Elsevier, N.Y. (1986), p. 355

DISCLOSURE OF THE INVENTION

Problems to be Solved by the Invention

It is an object of the present invention to solve the above problems and to provide a novel proton-conducting polymer membrane that is operable under high-temperature, non-humidified conditions, shows not only good proton conductivity but also good workability in a fuel cell assembling process, and exhibits sufficiently practical properties in terms of durability and to provide a method for production thereof and a fuel cell therewith.

Means for Solving the Problems

The present invention is directed to a proton-conducting polymer membrane, including: a polymer membrane containing a polybenzimidazole compound having a sulfonic acid group and/or a phosphonic acid group; and vinylphosphonic acid contained in the polymer membrane.

In the present invention, the polybenzimidazole compound preferably includes a component that contains a sulfonic acid group and/or a phosphonic acid group and is represented by Structural Formula (1):

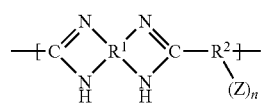
(1)

wherein n represents an integer of 1 to 4, $R^1$ represents a tetravalent aromatic linking unit capable of forming an imidazole ring, $R^2$ represents a bivalent aromatic linking unit, and Z represents a sulfonic acid group and/or a phosphonic acid group.

In the present invention, the polybenzimidazole compound preferably includes a component that contains a sulfonic acid group and/or a phosphonic acid group and is represented by Structural Formula (2):

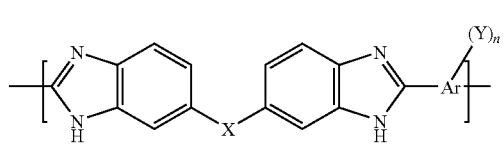
(2)

wherein X represents at least one linking structure selected from the group consisting of a direct bond, —O—, —SO$_2$—, —S—, —CO—, —C(CH$_3$)$_2$—, —C(CF$_3$)$_2$—, and —O-Ph-O—, Ar represents at least one linking structure selected from aromatic units, Ph represents an aromatic linking unit, Y represents at least one functional group selected from a sulfonic acid group and a phosphonic acid group and may be entirely in the form of an acid or may be entirely or partially in the form of a derivative, and n represents an integer of 1 to 4.

In the present invention, the polybenzimidazole compound preferably includes a component represented by Structural Formula (3):

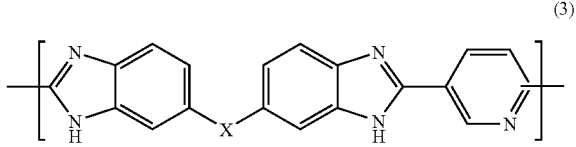
(3)

wherein X represents at least one linking structure selected from the group consisting of —O—, —SO$_2$—, —S—, —CO—, —C(CH$_3$)$_2$—, —C(CF$_3$)$_2$—, and —O-Ph-O—, and Ph represents at least one selected from ortho-phenylene, meta-phenylene and para-phenylene.

In the present invention, the structure represented by Structural Formula (3) above preferably includes, as a main component, a structure represented by Structural Formula (4):

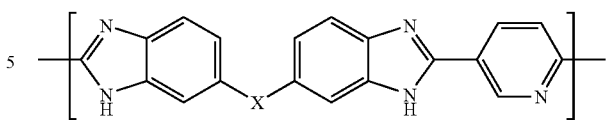
(4)

and/or
Structural Formula (5):

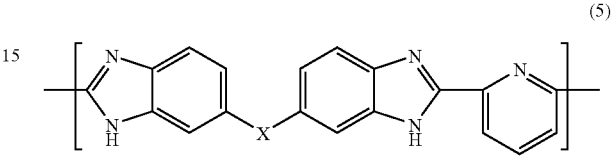
(5)

wherein X represents at least one linking structure selected from the group consisting of —O—, —SO$_2$—, —S—, —CO—, —C(CH$_3$)$_2$—, —C(CF$_3$)$_2$—, and —O-Ph-O—, and Ph represents at least one selected from ortho-phenylene, meta-phenylene and para-phenylene.

In the present invention, 10% by mass to 1000% by mass of vinylphosphonic acid is preferably contained, based on the mass of the polybenzimidazole compound.

The present invention is also directed to a method for producing the proton-conducting polymer membrane stated above, including the step of immersing a polymer membrane containing a polybenzimidazole compound having a sulfonic acid group and/or a phosphonic acid group in vinylphosphonic acid or in a solution containing vinylphosphonic acid.

The present invention is also directed to a fuel cell using the above-stated proton-conducting polymer membrane as a solid polymer electrolyte. Specifically, the present invention is directed to a fuel cell including a unit cell including an oxygen electrode, a fuel electrode, a solid polymer electrolyte membrane, an oxidant-feeding plate, and a fuel-feeding plate, wherein the solid polymer electrolyte membrane is sandwiched between the oxygen electrode and the fuel electrode, the oxidant-feeding plate is provided on the oxygen electrode side and forms an oxidant flow channel, the fuel-feeding plate is provided on the fuel electrode side and forms a fuel flow channel, and the solid polymer electrolyte membrane is the above-stated proton-conducting polymer membrane.

Effects of the Invention

The proton-conducting polymer membrane of the present invention includes a polybenzimidazole compound that has a sulfonic acid group and/or a phosphonic acid group as an acidic group and is impregnated with vinylphosphonic acid. Therefore, the proton-conducting polymer membrane of the present invention shows not only good proton conductivity but also good workability in a fuel cell assembling process and exhibits sufficiently practical properties in terms of durability, so that it can form a polymer electrolyte membrane that is suitable for use in fuel cells operable particularly under high-temperature, non-humidified conditions.

BRIEF DESCRIPTION OF THE DRAWINGS

FIG. 3 is a graph showing the relationship between the open-circuit voltage and the cell voltage at a current density of 0.3 A/cm² and the time of operation of a fuel cell in Example 1 and Comparative Example 1.

BEST MODES FOR CARRYING OUT THE INVENTION

Figure 1:
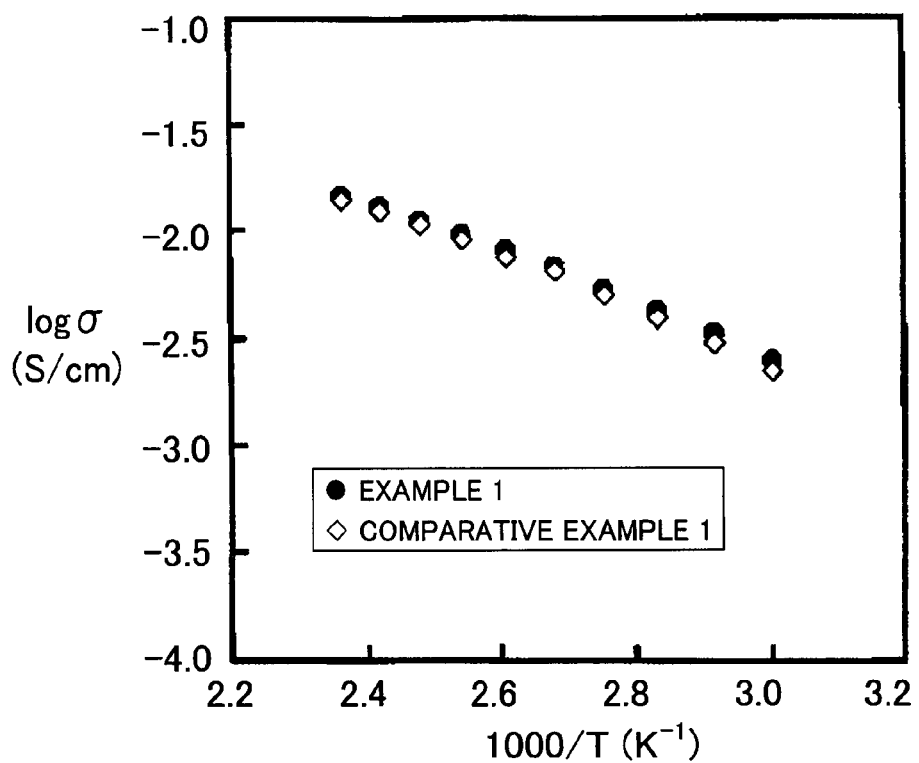
FIG. 1 is a graph showing the temperature dependence of the ion conductivity in Example 1 and Comparative Example 1.

In the proton-conducting polymer membrane of the present invention, a polymer membrane including a polybenzimidazole compound having a sulfonic acid group and/or a phosphonic acid group as an acidic group or groups is impregnated with vinylphosphonic acid. In the present invention, the sulfonic acid group includes both a group present in the form of free sulfonic acid and a group present in the form of a sulfonate salt, unless otherwise stated, and the phosphonic acid group includes both a group present in the form of free phosphonic acid and a group present in the form of a phosphonate salt, unless otherwise stated. In the present invention, the polybenzimidazole compound refers to a polymer compound containing a benzimidazole ring in a component unit forming the polymer chain.

In general, polybenzimidazole is synthesized by a polymerization reaction between two types of monomers: an aromatic tetramine or a derivative thereof and a dicarboxylic acid or a derivative thereof. Alternatively, polybenzimidazole may be synthesized by self-condensation of a compound having two amino groups or derivatives thereof and one carboxyl group in a single molecule. Polybenzimidazole may also be synthesized from a mixed system thereof. In the present invention, while there is no particular restriction on the structure of the polybenzimidazole compound having a sulfonic acid group and/or a phosphonic acid group, it is preferably synthesized using a dicarboxylic acid monomer containing a sulfonic acid group or a derivative thereof and/or a phosphonic acid group or a derivative thereof in the polymerization reaction thereof. This is because the sulfonic acid group or the phosphonic acid group may be introduced through a side chain attached to a nitrogen atom on an imidazole ring, but the polymer produced through such an introduction generally tends to have reduced solvent resistance. The sulfonic acid group may also be introduced onto a benzimidazole ring in a polybenzimidazole polymer by a sulfonation reaction or the like. In this case, however, such a polymer tends to have reduced heat resistance.

Specifically, the polybenzimidazole compound for use in the present invention having a sulfonic acid group and/or a phosphonic acid group preferably includes a component represented by Structural Formula (1):

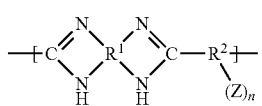

wherein n represents an integer of 1 to 4, R¹ represents a tetravalent aromatic linking unit capable of forming an imidazole ring, R² represents a bivalent aromatic linking unit, and Z represents a sulfonic acid group and/or a phosphonic acid group. If n is 0 in the unit, the proton conductivity can tend to be low. If n is 5 or more in the unit, the polymer can tend to have reduced water resistance. However, n may be partially 0 or at least 5 with no problem in a coexisting unit, as long as the structure includes the unit of Structural Formula (1). R¹ represents a tetravalent aromatic linking unit capable of forming an imidazole ring. R¹ may be a single aromatic ring or a combination or condensed ring of a plurality of aromatic rings and may have a stable substituent(s). Because of the aromatic unit R¹, the polybenzimidazole compound can have the property of keeping high chemical stability even when an acidic molecule coexists. R¹ may be a single structure or may include different structures. R² may be a single aromatic ring or a combination or condensed ring of a plurality of aromatic rings and may have a stable substituent(s) other than the sulfonic or phosphonic acid group. The sulfonic acid group and/or the phosphonic acid group is bonded through R² to the aromatic tetramine moiety so that the polybenzimidazole compound can have good ion conductivity and also have good solubility in solvents. Z representing a sulfonic acid group and/or a phosphonic acid group may be partially in the form of a salt. Examples of such a salt form include, but are not limited to, an alkali metal salt such as a sodium or potassium salt and any other metal salt, and an ammonium salt and an alkylammonium salt.

In the present invention, the polybenzimidazole compound having a sulfonic acid group and/or a phosphonic acid group more preferably includes a component represented by Structural Formula (2):

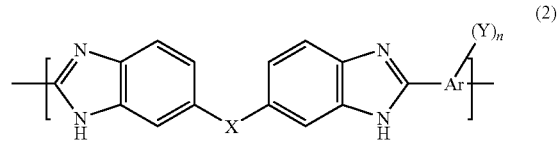

wherein X represents at least one linking structure selected from the group consisting of a direct bond, —O—, —SO₂—, —S—, —CO—, —C(CH₃)₂—, —C(CF₃)₂—, and —O-Ph-O—, Ar represents at least one linking structure selected from aromatic units, Ph represents an aromatic linking unit, Y represents at least one functional group selected from a sulfonic acid group and a phosphonic acid group and may be entirely in the form of an acid or may be entirely or partially in the form of a derivative, and n represents an integer of 1 to 4.

The derivative may be, but not limited to, a salt form such as an alkali metal salt including a sodium or potassium salt, and any other metal salt, and an ammonium salt and an alkylammonium salt. If n is 0 in the unit of the formula, the ability to produce the proton conductivity can tend to be low. If n is 5 or more in the unit, the polymer can tend to have reduced water resistance. However, n may be partially 0 or at least 5 with no problem in a coexisting unit, as long as the structure includes the unit of Structural Formula (2).

While any synthetic route may be used to form the polybenzimidazole compound including the structure represented by Structural Formula (1) or (2) according to the present invention, it may generally synthesized by the reaction of at least one compound selected from the group consisting of aromatic tetramines capable of forming the imidazole ring of the compound and derivatives thereof with at least one compound selected from the group consisting of aromatic dicarboxylic acids and derivatives thereof. In this process, the dicarboxylic acid to be used may contain a sulfonic acid group and/or a phosphonic acid group, or a derivative thereof, so that the sulfonic acid group and/or the phosphonic acid group can be introduced into the resulting polybenzimidazole compound. At least one dicarboxylic acid containing a sulfonic acid group and/or a phosphonic acid group may be used in combination. It will be understood that any dicarboxylic acid with no sulfonic or phosphonic acid group or no derivative thereof may also be used at the same time in the synthesis.

The monomer for forming any of these structures and another monomer for forming the structure of Structural Formula (3) (preferably Structural Formula (4) and/or (5)) shown later may be polymerized so that a polybenzimidazole having both a pyridine ring and an acid group unit represented by Structural Formula (2) above can be synthesized.

Concerning benzimidazole linking units constituting the polybenzimidazole compound for use in the present invention, a benzimidazole linking unit having a sulfonic acid group and/or a phosphonic acid group, another benzimidazole linking unit having neither the sulfonic acid group nor the phosphonic acid group, and any other linking unit are preferably bonded by random polymerization and/or alternating polymerization. The polymerization mode is not limited to a single mode, and two or more polymerization modes may coexist in a single compound.

Examples of the aromatic tetramine for forming the sulfonic and/or phosphonic acid group-containing polybenzimidazole compound including the component represented by Structural Formula (1) or (2) include, but are not limited to, 1,2,4,5-tetraaminobenzene, 3,3'-diaminobenzidine, 3,3',4,4'-tetraaminodiphenyl ether, 3,3',4,4'-tetraaminodiphenyl thioether, 3,3',4,4'-tetraaminodiphenyl sulfone, 3,3', 4,4'-tetraaminobenzophenone, 2,2-bis(3,4-diaminophenyl)propane, bis(3,4-diaminophenyl)methane, 2,2-bis(3,4-diaminophenyl)hexafluoropropane, 1,4-bis(3,4-diaminophenoxy)benzene, 1,3-bis(3,4-diaminophenoxy)benzene, 1,2-bis(3,4-diaminophenoxy)benzene, and derivatives thereof. Above all, 3,3'-diaminobenzidine, 3,3',4,4'-tetraaminodiphenyl ether, 3,3',4,4'-tetraaminodiphenyl sulfone, 3,3',4,4'-tetraaminodiphenyl thioether, 3,3',4,4'-tetraaminobenzophenone, 2,2-bis(3,4-diaminophenyl)propane, 2,2-bis(3,4-diaminophenyl)hexafluoropropane, 1,4-bis(3,4-diaminophenoxy)benzene, 1,3-bis(3,4-diaminophenoxy)benzene, 1,2-bis(3,4-diaminophenoxy)benzene, and derivatives thereof are particularly preferred, because they can form the linking unit represented by Structural Formula (2).

Examples of the derivatives of the aromatic tetramines include salts with acids such as hydrochloric acid, sulfuric acid, and phosphoric acid. One of these compounds may be used alone, or two or more of these compounds may be used at the same time. If necessary, any of these compounds may be mixed with a known antioxidant such as tin (II) chloride and a phosphorous acid compound.

An aromatic dicarboxylic acid having one to four sulfonic acid groups may be selected as the sulfonic acid group-containing dicarboxylic acid for forming the structure of Structural Formula (1) or (2). Examples of such an aromatic dicarboxylic acid include sulfonic acid group-containing dicarboxylic acids such as 2,5-dicarboxybenzenesulfonic acid, 3,5-dicarboxybenzenesulfonic acid, 2,5-dicarboxy-1,4-benzenedisulfonic acid, 4,6-dicarboxy-1,3-benzenedisulfonic acid, 2,2'-disulfo-4,4'-biphenyldicarboxylic acid, and 3,3'-disulfo-4,4'-biphenyldicarboxylic acid, and derivatives thereof. Examples of the derivatives include alkali metal salts such as sodium salts and potassium salts, ammonium salts, and alkylammonium salts. The structure of the sulfonic acid group-containing dicarboxylic acid is not particularly limited to the above. If the aromatic dicarboxylic acid skeleton has five or more sulfonic acid groups, the polymer can tend to have reduced water resistance.

The purity of the sulfonic acid group-containing dicarboxylic acid is preferably, but not limited to, at least 98% by mass, more preferably at least 99% by mass. The polybenzimidazole produced by polymerization of the sulfonic acid group-containing dicarboxylic acid as a starting material tends to have a low degree of polymerization as compared with that produced using a sulfonic acid group-free dicarboxylic acid. Therefore, it is preferred that a sulfonic acid group-containing dicarboxylic acid with a purity as high as possible should be used so that the resulting polymer can be prevented from having a reduced degree of polymerization.

Any compound having one to four phosphonic acid groups in an aromatic dicarboxylic acid skeleton is preferably used as the phosphonic acid group-containing aromatic dicarboxylic acid or the derivative thereof for use in synthesizing the phosphonic acid group-containing polybenzimidazole compound represented by Structural Formula (1) or (2) above. Examples of such a compound include phosphonic acid group-containing aromatic dicarboxylic acids such as 2,5-dicarboxyphenylphosphonic acid, 3,5-dicarboxyphenylphosphonic acid, 2,5-bisphosphonoterephthalic acid, and 4,6-bisphosphonoisophthalic acid, and derivatives thereof. If the aromatic dicarboxylic acid skeleton has five or more phosphonic acid groups, the polymer can tend to have reduced water resistance.

Examples of the derivative of the phosphonic acid group-containing aromatic dicarboxylic acid include alkali metal salts such as sodium salts and potassium salts, ammonium salts, and alkylammonium salts. One of these compounds may be used alone, or two or more of these compounds may be used at the same time. If necessary, any of these compounds may be mixed with a known antioxidant such as tin (II) chloride and a phosphorous acid compound.

While the structure of the phosphonic acid group-containing aromatic dicarboxylic acid is not limited to the above, aromatic dicarboxylic acids having a phosphonic acid group in the form of a phenylphosphonic acid group as shown above are preferred, because they can efficiently increase the content of the phosphonic acid group in the polymer chain.

The purity of the phosphonic acid group-containing aromatic dicarboxylic acid for use in synthesizing the polybenzimidazole compound according to the present invention is preferably, but not limited to, at least 97% by mass, more preferably at least 98% by mass. The polybenzimidazole compound produced by polymerization of the phosphonic acid group-containing aromatic dicarboxylic acid as a starting material tends to have a low degree of polymerization as compared with that produced using a sulfonic or phosphonic acid group-free aromatic dicarboxylic acid as a starting material. Therefore, it is preferred that a sulfonic acid group-containing dicarboxylic acid with a purity as high as possible should be used so that the resulting polymer can be prevented from having a reduced degree of polymerization. If the purity of the aromatic dicarboxylic acid is less than 97% by mass, the resulting polybenzimidazole compound can tend to have a low degree of polymerization and to be unsuitable as a solid polymer electrolyte material.

The phosphonic acid group-containing aromatic dicarboxylic acid and the sulfonic acid group-containing aromatic dicarboxylic acid may be mixed and used. Alternatively, the polybenzimidazole compound having the acidic group according to the present invention may be synthesized by a copolymerization reaction of the phosphonic acid group-containing aromatic dicarboxylic acid and/or the sulfonic acid group-containing aromatic dicarboxylic acid with an aromatic dicarboxylic acid having neither sulfonic nor phosphonic acid group. Examples of the sulfonic or phosphonic acid group-free aromatic dicarboxylic acid that may be used in this process include, but are not limited to, general aromatic dicarboxylic acids reported as materials for polyesters, such as terephthalic acid, isophthalic acid, naphthalenedicarboxylic acid, diphenyletherdicarboxylic acid, diphenylsulfonedicarboxylic acid, biphenyldicarboxylic acid, terphenyldicarboxylic acid, and 2,2-bis(4-carboxyphenyl)hexafluoropropane.

One of these compounds may be used alone, or two or more of these compounds may be used at the same time. If necessary, any of these compounds may be mixed with a known antioxidant such as tin (II) chloride and a phosphorous acid compound.

When the phosphonic or sulfonic acid group-containing aromatic dicarboxylic acid is used in combination with the sulfonic or phosphonic acid group-free aromatic dicarboxylic acid in the synthesis of the polybenzimidazole compound for use in the present invention, the materials are preferably mixed such that the content of the phosphonic and/or sulfonic acid group-containing aromatic dicarboxylic acid(s) in all the aromatic dicarboxylic acids reaches at least 20% by mole. In this case, the presence of the sulfonic acid group and/or the phosphonic acid group in the polybenzimidazole compound according to the present invention can significantly produce the effect of increasing the proton conductivity. In order to more significantly produce the effect of increasing the proton conductivity, the materials are more preferably mixed such that the content of the phosphonic and/or sulfonic acid group-containing aromatic dicarboxylic acid(s) in all the aromatic dicarboxylic acids reaches at least 50% by mole. If the content of the phosphonic and/or sulfonic acid group-containing aromatic dicarboxylic acid(s) is less than 20% by mole, the polybenzimidazole compound can have low electrical conductivity and tend to be unsuitable as a solid polymer electrolyte material.

In terms of good workability and good durability in the process of assembling fuel cells, the proton-conducting polymer membrane of the present invention preferably includes a component represented by Structural Formula (3):

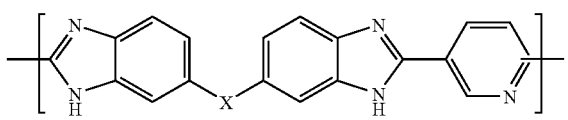

(3)

wherein X represents at least one selected from the group consisting of —O—, —SO$_2$—, —S—, —CO—, —C(CH$_3$)$_2$—, —C(CF$_3$)$_2$—, and —O-Ph-O—, and Ph represents at least one selected from ortho-phenylene, meta-phenylene and para-phenylene.

In the present invention, the structure represented by Structural Formula (3) above preferably includes a structure(s) represented by Structural Formula (4) below and/or Structural Formula (5) below as a main component(s), because monomers having such a structure(s) can have high reactivity and the resulting polymer can be easy to handle.

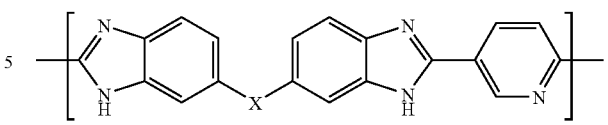

(4)

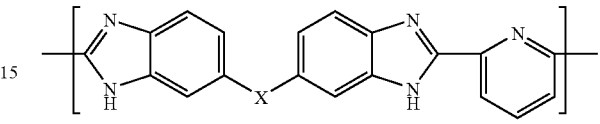

(5)

In Structural Formulae (4) and (5), X has the same meaning as defined above.

The polybenzimidazole having the above structure may be synthesized by a polymerization reaction between the monomers: an aromatic tetramine or a derivative thereof and a dicarboxylic acid having a pyridine ring or a derivative thereof. Examples of the aromatic tetramine for forming the structure of Structural Formula (3) above (preferably Structural Formula (4) or (5)) include 3,3',4,4'-tetraaminodiphenyl ether, 3,3',4,4'-tetraaminodiphenyl sulfone, 3,3',4,4'-tetraaminodiphenyl thioether, 3,3',4,4'-tetraaminobenzophenone, 2,2-bis(3,4-diaminophenyl)propane, 2,2-bis(3,4-diaminophenyl)hexafluoropropane, 1,4-bis(3,4-diaminophenoxy)benzene, 1,3-bis(3,4-diaminophenoxy)benzene, 1,2-bis(3,4-diaminophenoxy)benzene, and derivatives thereof. Examples of the derivatives of the aromatic tetramines include salts with acids such as hydrochloric acid, sulfuric acid, and phosphoric acid. If necessary, any of these compounds may be mixed with a known antioxidant such as tin (II) chloride and a phosphorous acid compound. One of these aromatic tetramines and derivatives thereof may be used alone, or two or more of these compounds may be mixed and used.

Examples of the dicarboxylic acid for forming the structure of Structural Formula (3) above (preferably Structural Formula (4) or (5)) include 2,5-pyridinedicarboxylic acid, 2,6-pyridinedicarboxylic acid, 2,3-pyridinedicarboxylic acid, 2,4-pyridinedicarboxylic acid, 3,4-pyridinedicarboxylic acid, 3,5-pyridinedicarboxylic acid, and derivatives thereof. Examples of the derivatives include acid chlorides and ester compounds of various lower alcohols. One of these dicarboxylic acids and derivatives thereof may be used alone, or two or more of these compounds may be mixed and used.

In addition to the structure represented by Structural Formula (3) above, the polybenzimidazole polymer membrane of the present invention may contain any other polybenzimidazole structure. The aromatic tetramine for use in such a structure may be, but not limited to, 1,2,4,5-tetraaminobenzene, 3,3'-diaminobenzidine, bis(3,4-diaminophenyl)methane, or the like, or any derivative thereof. Other dicarboxylic acids that may be used include general aromatic dicarboxylic acids reported as materials for polyesters, such as terephthalic acid, isophthalic acid, naphthalenedicarboxylic acid, diphenyletherdicarboxylic acid, diphenylsulfonedicarboxylic acid, biphenyldicarboxylic acid, terphenyldicarboxylic acid, and 2,2-bis(4-carboxyphenyl)hexafluoropropane, and derivatives thereof. Examples of other dicarboxylic acids that may be used also include sulfonic acid-containing dicarboxylic acids such as 2,5-dicarboxybenzenesulfonic acid, 3,5-dicarboxybenzenesulfonic acid, 2,5-dicarboxy-1,4-benzenedisulfonic acid, 4,6-dicarboxy-1,3-benzenedisulfonic acid, 2,2'-disulfo-4,4'-biphenyldicarboxylic acid, and 3,3'-disulfo-4,4'-biphenyldicarboxylic acid, and derivatives thereof, and phosphonic acid group-containing aromatic dicarboxylic acids such as 2,5-dicarboxyphenylphosphonic acid, 3,5-dicarboxyphenylphosphonic acid, 2,5-bisphosphonoterephthalic acid, and 4,6-bisphosphonoisophthalic acid, and derivatives thereof.

Alternatively, the synthesis may be performed in a polymerization system containing a compound having two amino groups or derivatives thereof and one carboxyl group in a single molecule. When the proton-conducting polymer membrane of the present invention includes the structure represented by Structural Formula (3) above (preferably Structural Formula (4) and/or Structural Formula (5) above), the proton-conducting polymer membrane of the present invention may include such a structure as a main component, in which other structural components may be less than 50% of all the components.

The sulfonic and/or phosphonic acid group-containing polybenzimidazole compound may be synthesized using at least one compound selected from the group consisting of the above aromatic tetramines and derivatives thereof and at least one compound selected from the group consisting of aromatic dicarboxylic acids and derivatives thereof. For example, this synthetic method may be, but not limited to, a method in which the synthesis is performed by dehydration using polyphosphoric acid as a solvent and by cyclization polymerization as described in J. F. Wolfe, Encyclopedia of Polymer Science and Engineering, 2nd Ed., Vol. 11, P. 601 (1988). Polymerization may also be performed using the same mechanism, except that a methanesulfonic acid/phosphorus pentoxide mixed solvent system is used in place of polyphosphoric acid. In order to synthesize a polybenzimidazole compound with high thermal stability, polymerization is preferably performed using polyphosphoric acid, which is generally often used.

The polybenzimidazole compound for use in the present invention may also be obtained using a method that includes: synthesizing a precursor polymer having a polyamide structure or the like, for example, by a reaction in an appropriate organic solvent or in a state of a mixed monomer material melt; and then converting the precursor polymer into the desired polybenzimidazole structure by a cyclization reaction using appropriate heat treatment or the like.

In the process of synthesizing the polybenzimidazole compound for use in the present invention, the reaction time may be optimal depending on a combination of the respective starting monomers and thus cannot be universally specified. If a long time is taken to perform the reaction as conventionally reported, the polybenzimidazole compound derived from a system containing the sulfonic or phosphonic acid group-containing aromatic dicarboxylic acid and so on as starting monomers can have reduced thermal stability. Thus, the reaction time should preferably be reduced within the range where the effect of the present invention can be produced. If the reaction time is reduced in such a manner, the polybenzimidazole compound having a sulfonic acid group and a phosphonic acid group can be produced in a highly heat-stable state.

In the process of synthesizing the polybenzimidazole compound for use in the present invention, the reaction temperature may be optimal depending on a combination of the respective starting monomers and thus cannot be universally specified. If the reaction is performed at high temperature as conventionally reported, it can be impossible in some cases to control the amount of the introduction of the sulfonic or phosphonic acid group into the polybenzimidazole compound, which is derived from a system containing the sulfonic or phosphonic acid group-containing aromatic dicarboxylic acid and so on as monomers. Thus, the reaction temperature should preferably be lowered within the range where the effect of the present invention can be produced. If the reaction temperature is lowered in such a manner, it will be possible to control the amount of the introduction of the sulfonic or phosphonic acid group into the polybenzimidazole compound with high acidic group content.

When different types of monomers are used to form the repeating units of the synthesized polybenzimidazole compound, the repeating units are preferably bonded by random polymerization and/or alternating polymerization. In this case, the polybenzimidazole compound can exhibit stable electrical properties and durability to serve as a material for polymer electrolyte membranes. Alternating polymerization refers to a bonding mode in which the same repeating units are substantially not bonded to each other in a sequential manner. Alternating polymerization can be clearly distinguished from random polymerization or block polymerization described later (for example, can be identified using an evaluation of the chain distribution measured by NMR). When the polybenzimidazole compound for use in the present invention is synthesized in random polymerization mode and/or alternating polymerization mode, a polymerization method is preferably used in which all starting monomers are provided at the initial stage of polymerization in a mixing ratio satisfying the equivalence.

The polybenzimidazole compound may also be synthesized using block polymerization in place of random polymerization or alternating polymerization. In such a case, it is preferred that an oligomer should be synthesized as a first component under the conditions where starting monomers are provided in a mixing ratio deviating from the equivalence, and then starting monomers should be additionally provided in order that the mixing ratio of the materials including a second component may be adjusted to satisfy the equivalence, before polymerization is performed.

In the present invention, the number average molecular weight of the polybenzimidazole compound having a sulfonic acid group and/or a phosphonic acid group is preferably, but not limited to, at least 2,000, more preferably at least 4,000. The number average molecular weight is preferably at most 1,000,000, more preferably at most 300,000. If the number average molecular weight is less than 2,000, forming the polybenzimidazole compound into a product with good durability and so on can tend to be difficult due to a reduction in viscosity. If the molecular weight is more than 1,000,000, forming of the polybenzimidazole compound can tend to be difficult due to an increase in viscosity.

The number average molecular weight of the polybenzimidazole compound having a sulfonic acid group and/or a phosphonic acid group according to the present invention can be substantially evaluated using a inherent viscosity measured in methanesulfonic acid. The inherent viscosity is preferably at least 0.3, in particular, more preferably at least 0.50. On the other hand, the inherent viscosity is preferably at most 8, in particular, more preferably at most 7. If the inherent viscosity is less than 0.3, forming the polybenzimidazole compound into a product with good durability and so on can tend to be difficult due to a reduction in viscosity. If the inherent viscosity is more than 8, forming of the polybenzimidazole compound can tend to be difficult due to an increase in viscosity.

The polybenzimidazole compound having a sulfonic acid group and/or a phosphonic acid group according to the present invention is preferably used as a main component in a resin composition. Examples of polymers that may be used in combination with the polybenzimidazole compound for use in the present invention to form a resin composition include, but are not limited to, polyesters such as polyethylene terephthalate, polybutylene terephthalate and polyethylene naphthalate, polyamides such as nylon 6, nylon 6,6, nylon 6,10, and nylon 12, poly(methyl methacrylate), polymethacrylates, acrylate resins such as poly(methyl acrylate) and polyacrylates, polyacrylic acid resins, polymethacrylic acid resins, a variety of polyolefins including polyethylene, polypropylene, polystyrene, and diene polymers, polyurethane resins, cellulose resins such as cellulose acetate and ethyl cellulose, aromatic polymers such as polyarylate, aramid, polycarbonate, polyphenylene sulfide, polyphenylene oxide, polysulfone, polyethersulfone, polyether ether ketone, polyether imide, polyimide, polyamide imide, polybenzimidazole, polybenzoxazole and polybenzothiazole, and thermosetting resins such as epoxy resins, phenol resins, novolac resins, and benzoxazine resins.

When the polybenzimidazole compound for use in the present invention is used to form a resin composition, the polybenzimidazole compound preferably makes up at least 50% by mass and less than 100% by mass of the whole of the resin composition, more preferably at least 60% by mass and less than 100% by mass, still more preferably at least 70% by mass and less than 100% by mass of the whole of the resin composition. If the content of the sulfonic and/or phosphonic acid group-containing polybenzimidazole compound for use in the present invention in the whole of the resin composition is less than 50% by mass, the concentration of the acidic group in the polymer membrane containing the resin composition can be low so that the effect of the ionic group in increasing the proton conductivity can tend to be low and that the sulfonic and/or phosphonic acid group-containing unit can be in a discontinuous phase, which tends to count against the conducting ion mobility. If necessary, a variety of additives such as an antioxidant, a thermal stabilizer, a lubricant, a tackifier, a plasticizer, a crosslinking agent, a viscosity adjuster, an antistatic agent, an anti-microbial agent, an anti-foaming agent, a dispersing agent, and a polymerization inhibitor may be added to the sulfonic and/or phosphonic acid group-containing polybenzimidazole compound for use in the present invention or to the resin composition containing it.

From a polymerization solution, an isolated polymer, a re-dissolved polymer solution, or the like, the sulfonic and/or phosphonic acid group-containing polybenzimidazole compound for use in the present invention or the resin composition containing it may be formed into a membrane by any method such as extrusion, rolling, and casting. Casting from a solution is a preferred method for forming, into a polymer membrane, the sulfonic and/or phosphonic acid group-containing polybenzimidazole compound for use in the present invention or the resin composition containing it. An appropriate solvent for dissolving the polybenzimidazole compound or the resin composition containing it may be selected from, but not limited to, polar aprotic solvents such as N,N-dimethylacetamide, N,N-dimethylformamide, dimethyl sulfoxide, N-methyl-2-pyrrolidone, and hexamethylphosphoramide, and strong acids such as polyphosphoric acid, methanesulfonic acid, sulfuric acid, and trifluoroacetic acid. In particular, among these solvents, organic solvent systems are preferably used. N,N-dimethylacetamide, N,N-dimethylformamide, dimethyl sulfoxide, or N-methyl-2-pyrrolidone is more preferably selected as the solvent, because the polybenzimidazole according to the present invention can be well dissolved therein. Two or more of these solvents may be mixed and used, if possible. A Lewis acid such as lithium bromide, lithium chloride, or aluminum chloride may be added to an organic solvent so that the solubility of the polybenzimidazole or the resin composition containing it in the solvent can be increased. The concentration of the polymer in the solution is preferably in the range of 0.1 to 50% by mass. If the polymer concentration is less than 0.1% by mass, the formability can tend to be poor. If the polymer concentration is more than 50% by mass, the workability can tend to be poor.

The polymer solution may be cast on a substrate, and then the solvent may be removed. In this process, the solvent is preferably removed by drying in view of membrane uniformity. In order to avoid decomposition or degradation of the polymer or the solvent, drying is also preferably performed under reduced pressure at a temperature as low as possible. A glass plate, a Teflon® plate, a metal plate, a polymer sheet, or the like may be used as the substrate on which casting is performed. When the viscosity of the solution is high, the substrate or the solution may be heated so that the viscosity of the solution can be reduced, and thus casting can be easily performed at high temperature.

The thickness of the solution being cast is preferably, but not limited to, from 30 to 1500 µm. If the thickness is less than 30 µm, the membrane form can tend to be difficult to maintain. If the thickness is more than 1500 µm, an uneven membrane can tend to be formed. The thickness of the solution is more preferably from 100 to 1000 µm. Known methods may be used to control the thickness of the cast solution. For example, a constant thickness may be ensured using an applicator, a doctor blade, or the like, or the thickness may be controlled by controlling the amount or concentration of the solution, while the cast area is kept constant with a glass Petri dish or the like. If the rate of removal of the solvent is adjusted, the cast solution can be formed into an even membrane. For example, when the solvent is heated and removed by evaporation, the temperature may be set low at the initial stage such that the evaporation rate can be kept low. Alternatively, the solvent may be removed by immersion in a non-solvent such as water. In such a case, the solution may be allowed to stand in the air or an inert gas for an appropriate time period so that the rate of solidification of the polymer can be adjusted. While the membrane of the present invention may have any thickness, depending on the purpose, the membrane is preferably as thin as possible in view of ion conductivity. Specifically, the thickness is preferably at most 200 µm, more preferably at most 50 µm. In view of the strength or workability of the membrane, the membrane preferably has a thickness of at least 5 µm.

The polybenzimidazole compound-containing polymer membrane is impregnated with vinylphosphonic acid so that the proton-conducting polymer membrane of the present invention is obtained. In general, the development of the proton conductivity by the impregnation, the behavior thereof, the possible amount of the impregnation with the acid compound, the swelling and deformation of the polymer membrane by the impregnation, the durability of the resulting proton-conducting polymer membrane, and the like vary with the type of a combination of the polybenzimidazole compound-containing polymer membrane and the acid compound with which the polymer membrane is impregnated. In the present invention, the polybenzimidazole compound is used in combination with vinylphosphonic acid so that there can be provided a proton-conducting polymer membrane characterized in that it exhibits good proton conductivity, has durability allowing it to stand long-term use, and is less deformed even when impregnated with a sufficient amount of vinylphosphonic acid. The polybenzimidazole compound according to the present invention is preferably impregnated with 10% by mass to 1000% by mass of vinylphosphonic acid, more preferably with 50% by mass to 800% by mass of vinylphosphonic acid, based on the mass of the polybenzimidazole compound. If the polybenzimidazole compound is impregnated with less than 10% by mass of vinylphosphonic acid, the proton conductivity can tend to be low under high-temperature, non-humidified conditions. On the other hand, if the polybenzimidazole compound is impregnated with more than 1000% by mass of vinylphosphonic acid, the problem of seepage of vinylphosphonic acid from the polymer electrolyte membrane and the like can tend to occur.

According to the present invention, the method for impregnating the polybenzimidazole compound-containing polymer membrane with vinylphosphonic acid preferably includes immersing the polymer membrane in vinylphosphonic acid itself or in a solution containing vinylphosphonic acid. The content of the vinylphosphonic acid impregnant may be controlled by changing the temperature conditions or the immersion time in the immersion process. While the content of the vinylphosphonic acid impregnant may depend on a combination of the immersion temperature and the immersion time, the immersion is preferably performed at a temperature in the range of 20° C. to 150° C., and the immersion time is preferably in the range of 10 minutes to 20 hours, for example. The purity of vinylphosphonic acid for use in the impregnation is preferably at least 50% by mass, and an impurity, such as phosphoric acid and ethylphosphonic acid, as a by-product of vinylphosphonic acid production may be associated with the vinylphosphonic acid to be used. In order to control the viscosity of vinylphosphonic acid, a solution of vinylphosphonic acid in a solvent compatible with vinylphosphonic acid may be used as long as the purity of vinylphosphonic acid is not less than 50% by mass.

In addition, vinylphosphonic acid and any other inorganic and/or organic acidic compound may be used for the impregnation at the same time. Examples of such an inorganic acid that may be used include phosphoric acid, polyphosphoric acid, sulfuric acid, nitric acid, hydrofluoric acid, hydrochloric acid, hydrobromic acid, and derivatives thereof. An organic sulfonic acid or an organic phosphonic acid may be used as the organic acid. Examples of the organic sulfonic acid include, but are not limited to, alkylsulfonic acids such as methanesulfonic acid, ethanesulfonic acid, hexanesulfonic acid, octylsulfonic acid, dodecylsulfonic acid, cetylsulfonic acid, sulfosuccinic acid, sulfoglutaric acid, sulfoadipic acid, sulfopimelic acid, sulfosuberic acid, sulfoazelaic acid, and sulfosebacic acid; perfluoroalkylsulfonic acids such as trifluoromethanesulfonic acid, pentafluoroethanesulfonic acid, and heptafluoropropylsulfonic acid; aromatic sulfonic acids such as benzenesulfonic acid, 1,3-benzenedisulfonic acid, toluenesulfonic acid, octylbenzenesulfonic acid, 2-methyl-5-isopropylbenzenesulfonic acid, dodecylbenzenesulfonic acid, dinonylnaphthalenesulfonic acid, naphthalenesulfonic acid, chlorobenzenesulfonic acid, phenolsulfonic acid, trichlorobenzenesulfonic acid, nitrotoluenesulfonic acid, nitrobenzenesulfonic acid, and sulfobenzoic acid; and derivatives thereof, and organic sulfonic acids having various structures may be used. Examples of the organic phosphonic acid include, but are not limited to, aromatic phosphonic acids such as phenylphosphonic acid and 1,3-dicarboxyphenylphosphonic acid; aliphatic phosphonic acids such as 1-hydroxyethane-1,1-diphosphonic acid; and derivatives thereof, and organic phosphonic acids having various structures may be used. A single type of acidic compound may be used for the impregnation, or two or more types of acidic compounds may be used in the form of a mixture for the impregnation. When vinylphosphonic acid and any other inorganic and/or organic acidic compound are used for the impregnation at the same time, vinylphosphonic acid preferably makes up at least 50 mol % of the acidic compounds for the impregnation.

When the inorganic and/or organic acid compound is used in combination with vinylphosphonic acid, the polymer membrane for use in the present invention is preferably impregnated with 10 to 1000% by weight, more preferably 50 to 800% by weight of acidic molecules including the inorganic and/or organic acid compound and vinylphosphonic acid, based on the weight of the polymer membrane. If the content of the acid molecule impregnant is less than 10% by weight based on the weight of the polymer membrane, the proton conductivity can tend to be low under high-temperature, non-humidified conditions. If the content of the acid molecule impregnant is more than 1000% by weight based on the weight of the polymer membrane, the problem of seepage of the acid molecules from the polymer electrolyte membrane and the like can tend to occur. The content of the impregnant may be determined by a process including extracting all the acid molecules from the polymer electrolyte membrane by hot water extraction and calculating the content of the impregnant from a difference between the weights of the membrane before and after the extraction according to the formula: 100×[(the membrane weight before the extraction)−(the membrane weight after the extraction)/(the membrane weight after the extraction)](%).

The impregnation with the above acidic molecule may be performed using the same method as for the impregnation with vinylphosphonic acid. In the present invention, the polybenzimidazole-containing polymer membrane may be impregnated with the acidic molecule by a method of impregnating the polymer membrane in a liquid of the acidic molecule itself or in a solution containing the acidic molecule. In this process, the acidic molecule content may be controlled by changing the temperature conditions for the immersion or the immersion time. While the acidic molecule content may depend on a combination of the immersion temperature and the immersion time, the immersion is preferably performed at a temperature in the range of 20° C. to 150° C. If the temperature is less than 20° C., the impregnation speed can tend to be low. If the temperature is more than 150° C., the membrane can tend to be deformed during the impregnation. The immersion time is preferably in the range of 10 minutes to 20 hours. If the immersion time is less than 10 minutes, sufficiently even impregnation with the acidic molecule can tend to be difficult to perform. If the immersion time is more than 20 hours, the productivity can tend to be low. When the immersion process is performed using a vinylphosphonic acid-containing solution, a solvent well miscible with the acidic molecule, such as water and a lower alcohol, may be used. The concentration of the solution is preferably at least 50%.

A membrane-electrode complex composed of the ion-conducting polymer membrane of the present invention and an electrode may be obtained by placing the above-described ion-conducting polymer membrane of the present invention on the electrode. The membrane-electrode complex may be produced using a known conventional method such as: a method of bonding the proton-conducting polymer membrane to the electrode with an adhesive applied on the surface of the electrode; and a method of heating and pressing the proton-conducting polymer membrane and the electrode. Thus, there is provided a unit cell including: an oxygen electrode; a fuel electrode; a solid polymer electrolyte membrane including the proton-conducting polymer membrane of the present invention sandwiched between the oxygen electrode and the fuel electrode; an oxidant-feeding plate that forms an oxidant flow channel and is provided on the oxygen electrode side; and a fuel-feeding plate that forms a fuel flow channel and is provided on the fuel electrode side, so that a fuel cell that operates particularly at a high temperature of at least 100° C. and does not require humidified conditions can be obtained.

EXAMPLES

The present invention is more specifically described with some examples below, which are not intended to limit the scope of the present invention. Performance evaluations were performed by the methods below in the examples and the comparative examples.

Inherent Viscosity

Polymer powder (polybenzimidazole compound) was dissolved at a concentration of 0.5 g/dl in methanesulfonic acid. The viscosity of the solution was measured with an Ostwald viscometer in a thermostatic chamber at 30° C. and evaluated in the form of inherent viscosity [ln(ta/tb)]/c, wherein ta is the number of seconds for the dropping of the sample solution, tb is the number of seconds for the dropping of the solvent only, and c is the polymer concentration (g/dl).

Ion Conductivity

The prepared proton-conducting polymer membrane was sandwiched between platinum electrodes (13 mm in diameter) and measured for complex impedance with an electrochemical measurement system 12608W manufactured by Solartron, and the temperature dependence of the ion conductivity (unit: S/cm) was determined from the resulting resistance values.

Power Generation Characteristics

The prepared proton-conducting polymer membrane was sandwiched between commercially available fuel cell electrodes (manufactured by Electrochem) to form a membrane-electrode complex, with which at 150° C. under non-humidified conditions with hydrogen/air, the initial open-circuit voltage and the open-circuit voltage after 500 hours were measured, and at a current density of 0.3 A/cm$^2$, the initial cell voltage and the cell voltage after 500 hours were measured during electric power generation. From the resulting values, the initial voltage was normalized as 100%, and then the reduction rate (%) after 500 hours was calculated.

Example 1

In a polymerization vessel were weighed 6.000 g (2.1557× 10$^{-2}$ mol) of 3,3',4,4'-tetraaminodiphenylsulfone, 5.7812 g (2.1557×10$^{-2}$ mol) of monosodium 2,5-dicarboxybenzenesulfonate (99% by mass in purity), 52.8 g of polyphosphoric acid (with a phosphorus pentoxide content of 75% by mass), and 43.3 g of phosphorus pentoxide. Under a stream of nitrogen, the mixture was heated to 100° C. with gentle stirring on an oil bath. After held at 100° C. for 1 hour, the mixture was heated to 150° C. and polymerized for 1 hour, and then heated to 200° C. and polymerized for 6 hours. After the polymerization was completed, the product was allowed to stand to cool. Water was added to the product, and the polymerization product was taken out and repeatedly washed with water in a home mixer until the pH became neutral on pH indicator paper. The resulting polymer was dried under reduced pressure at 80° C. overnight. The polymer showed a inherent viscosity of 2.18.

On an oil bath, 1 g of the resulting polymer was dissolved in 10 g of N-methyl-2-pyrrolidone (NMP). The solution was cast on a glass plate placed on a hot plate, and the NMP was removed by evaporation until a film was formed, and then the film was immersed in water at least overnight. The resulting film was immersed in dilute sulfuric acid (containing 6 ml of concentrated sulfuric acid and 300 ml of water) for at least one day and then further washed by immersing it in pure water several times so that the acid components were removed. As a result, a 22 μm-thick polymer membrane (named Polymer Membrane 1) was obtained.

Polymer Membrane 1 was immersed in vinylphosphonic acid (85% by mass in purity, manufactured by Tokyo Chemical Industry Co., Ltd.) at 120° C. for 3 hours so that a vinylphosphonic acid-containing, proton-conducting polymer membrane was obtained. At this time, the vinylphosphonic acid content calculated from the mass change was about 240% by mass, based on the mass of Polymer Membrane 1.

Using the resulting proton-conducting polymer membrane, the temperature dependence of the ion conductivity and the power generation characteristics were evaluated by the methods described above. The results are shown in Table 1.

Example 2

In a polymerization vessel were weighed 1.830 g (6.575× 10$^{-3}$ mol) of 3,3',4,4'-tetraaminodiphenylsulfone, 1.084 g (4.405×10$^{-3}$ mol) of 3,5-dicarboxyphenylphosphonic acid (98% by mass in purity), 0.360 g (2.170×10$^{-3}$ mol) of terephthalic acid, 24.98 g of polyphosphoric acid (with a phosphorus pentoxide content of 75% by mass), and 20.02 g of phosphorus pentoxide. Under a stream of nitrogen, the mixture was heated to 100° C. with gentle stirring on an oil bath. After held at 100° C. for 1 hour, the mixture was heated to 150° C. and polymerized for 1 hour, and then heated to 200° C. and polymerized for 5 hours. After the polymerization was completed, the product was allowed to stand to cool. Water was added to the product, and the polymerization product was taken out and repeatedly washed with water in a home mixer until the pH became neutral on pH indicator paper. The resulting polymer was dried under reduced pressure at 80° C. overnight. The polymer showed a inherent viscosity of 1.79.

On an oil bath, 1 g of the resulting polymer was dissolved in 10 g of NMP. The solution was cast on a glass plate placed on a hot plate, and the NMP was removed by evaporation until a film was formed, and then the film was immersed in water at least overnight. The resulting film was immersed in dilute sulfuric acid (containing 6 ml of concentrated sulfuric acid and 300 ml of water) for at least one day and then further washed by immersing it in pure water several times so that the acid components were removed. As a result, a 22 μm-thick polymer membrane (named Polymer Membrane 2) was obtained.

Vinylphosphonic acid was added to Polymer Membrane 2 by the same method as in Example 1 so that a proton-conducting polymer membrane was obtained. At this time, the vinylphosphonic acid content calculated from the mass change was about 250% by mass, based on the mass of Polymer Membrane 2. Using the proton-conducting polymer membrane, the ion conductivity and the power generation characteristics of the fuel cell were measured by the same methods as in Example 1. The results are shown in Table 1.

Example 3

In a polymerization vessel were weighed 1.830 g (6.575× 10$^{-3}$ mol) of 3,3',4,4'-tetraaminodiphenylsulfone, 0.529 g (1.973×10$^{-3}$ mol) of monosodium 2,5-dicarboxybenzenesulfonate (99% by mass in purity), 1.133 g (4.602×10$^{-3}$ mol)

of 3,5-dicarboxyphenylphosphonic acid (98% by mass in purity), 24.98 g of polyphosphoric acid (with a phosphorus pentoxide content of 75% by mass), and 20.02 g of phosphorus pentoxide. Under a stream of nitrogen, the mixture was heated to 100° C. with gentle stirring on an oil bath. After held at 100° C. for 1 hour, the mixture was heated to 150° C. and polymerized for 1 hour, and then heated to 200° C. and polymerized for 5 hours. After the polymerization was completed, the product was allowed to stand to cool. Water was added to the product, and the polymerization product was taken out and repeatedly washed with water in a home mixer until the pH became neutral on pH indicator paper. The resulting polymer was dried under reduced pressure at 80° C. overnight. The polymer showed a inherent viscosity of 1.21.

On an oil bath, 1 g of the resulting polymer was dissolved in 10 g of NMP. The solution was cast on a glass plate placed on a hot plate, and the NMP was removed by evaporation until a film was formed, and then the film was immersed in water at least overnight. The resulting film was immersed in dilute sulfuric acid (containing 6 ml of concentrated sulfuric acid and 300 ml of water) for at least one day and then further washed by immersing it in pure water several times so that the acid components were removed. As a result, a 21 μm-thick polymer membrane (named Polymer Membrane 3) was obtained.

Vinylphosphonic acid was added to Polymer Membrane 3 by the same method as in Example 1 so that a proton-conducting polymer membrane was obtained. At this time, the vinylphosphonic acid content calculated from the mass change was about 210% by mass, based on the mass of Polymer Membrane 3.

Using the proton-conducting polymer membrane, the ion conductivity and the power generation characteristics of the fuel cell were measured by the same methods as in Example 1. The results are shown in Table 1.

Example 4

Polymer Membrane 1 obtained in Example 1 was immersed in vinylphosphonic acid (85% by mass in purity, manufactured by Tokyo Chemical Industry Co., Ltd.) at 70° C. for 12 hours so that a vinylphosphonic acid-containing, proton-conducting polymer membrane was obtained. At this time, the vinylphosphonic acid content calculated from the mass change was about 180% by mass, based on the mass of Polymer Membrane 1.

Using the proton-conducting polymer membrane, the ion conductivity and the power generation characteristics of the fuel cell were measured by the same methods as in Example 1. The results are shown in Table 1.

Example 5

Polymer Membrane 1 obtained in Example 1 was immersed in vinylphosphonic acid (85% by mass in purity, manufactured by Tokyo Chemical Industry Co., Ltd.) at 90° C. for 7 hours so that a vinylphosphonic acid-containing, proton-conducting polymer membrane was obtained. At this time, the vinylphosphonic acid content calculated from the mass change was about 310% by mass, based on the mass of Polymer Membrane 1.

Using the proton-conducting polymer membrane, the ion conductivity and the power generation characteristics of the fuel cell were measured by the same methods as in Example 1. The results are shown in Table 1.

Comparative Example 1

Poly-2,2'-(m-phenylene)-5,5'-bibenzimidazole was obtained on the basis of the production method described in U.S. Pat. Nos. 3,313,783 and 3,509,108 and so on. On an oil bath, 1 g of the polymer was dissolved in 10 g of dimethylacetamide (DMAc). The solution was cast on a glass plate placed on a hot plate, and the DMAc was removed by evaporation until a film was formed. The film was further dried under vacuum at 120° C. for 12 hours so that the DMAc was completely removed. As a result, a 20 μm-thick polymer membrane (named Polymer Membrane 4) was obtained.

Polymer Membrane 4 was immersed in ortho-phosphoric acid (85% by mass in purity, manufactured by Tokyo Chemical Industry Co., Ltd.) at room temperature for 3 hours so that an ortho-phosphoric acid-containing, proton-conducting polymer membrane was obtained. At this time, the ortho-phosphoric acid content calculated from the mass change was about 350% by mass, based on the mass of Polymer Membrane 4.

Using the resulting proton-conducting polymer membrane, the temperature dependence of the ion conductivity and the power generation characteristics of the fuel cell were measured by the same methods as in Example 1. The results are shown in Table 2.

Comparative Example 2

Vinylphosphonic acid was added to Polymer Membrane 4 obtained in Comparative Example 1 by the same method as in Example 1 so that a proton-conducting polymer membrane was obtained. At this time, the vinylphosphonic acid content calculated from the mass change was about 390% by mass, based on the mass of Polymer Membrane 4.

Using the proton-conducting polymer membrane, the ion conductivity and the power generation characteristics of the fuel cell were measured by the same methods as in Example 1. The results are shown in Table 2.

Comparative Example 3

An attempt was made to add ortho-phosphoric acid (85% by mass in purity, manufactured by Tokyo Chemical Industry Co., Ltd.) to Polymer Membrane 1 obtained in Example 1 by immersing Polymer Membrane 1 in the ortho-phosphoric acid. However, Polymer Membrane 1 was dissolved, and it was not possible to perform the next experiments.

TABLE 1

|  | Example 1 | Example 2 | Example 3 | Example 4 | Example 5 |
|---|---|---|---|---|---|
| Polymer Membranes | Polymer Membrane 1 | Polymer Membrane 2 | Polymer Membrane 3 | Polymer Membrane 1 | Polymer Membrane 1 |
| Acid Type for Impregnation | Vinylphosphonic Acid | Vinylphosphonic Acid | Vinylphosphonic Acid | Vinylphosphonic Acid | Vinylphosphonic Acid |
| Acid Impregnation Amount (mass %) | 240 | 250 | 210 | 180 | 310 |
| Ion Conductivity (at 150° C.) ($\times 10^{-2}$ S/cm) | 1.4 | 1.5 | 1.1 | 1.0 | 1.8 |

TABLE 1-continued

|  |  |  | Example 1 | Example 2 | Example 3 | Example 4 | Example 5 |
|---|---|---|---|---|---|---|---|
| Power Generation Characteristics | Initial | Open-Circuit Voltage (V) | 0.984 | 0.995 | 0.975 | 0.985 | 0.971 |
|  |  | Voltage (V) (0.3 A/cm$^2$) | 0.573 | 0.570 | 0.566 | 0.565 | 0.581 |
|  | After 500 Hours | Open-Circuit Voltage (V) | 0.980 | 0.988 | 0.974 | 0.983 | 0.968 |
|  |  | Reduction Rate (%) | 0.4 | 0.7 | 0.1 | 0.2 | 0.3 |
|  |  | Voltage (V) (0.3 A/cm$^2$) | 0.571 | 0.566 | 0.564 | 0.564 | 0.576 |
|  |  | Reduction Rate (%) | 0.4 | 0.7 | 0.4 | 0.2 | 0.9 |

TABLE 2

|  |  |  | Comparative Example 1 | Comparative Example 2 | Comparative Example 3 |
|---|---|---|---|---|---|
| Polymer Membranes |  |  | Polymer Membrane 4 | Polymer Membrane 4 | Polymer Membrane 1 |
| Acid Type for Impregnation |  |  | Ortho-Phosphoric Acid | Vinylphosphonic Acid | Ortho-Phosphoric Acid |
| Acid Impregnation Amount (mass %) |  |  | 350 | 390 | Unmeasurable due to Dissolution of Polymer Membrane |
| Ion Conductivity (at 150° C.) (×10$^{-2}$ S/cm) |  |  | 1.4 | 1.4 |  |
| Power Generation Characteristics | Initial | Open-Circuit Voltage (V) | 0.951 | 0.965 |  |
|  |  | Voltage (V) (0.3 A/cm$^2$) | 0.546 | 0.568 |  |
|  | After 500 Hours | Open-Circuit Voltage (V) | 0.882 | 0.930 |  |
|  |  | Reduction Rate (%) | 7.3 | 3.6 |  |
|  |  | Voltage (V) (0.3 A/cm$^2$) | 0.481 | 0.545 |  |
|  |  | Reduction Rate (%) | 13.5 | 4.2 |  |

The results shown in Tables 1 and 2 indicate that in the initial state, there is no significant difference in any of the open-circuit voltage and the voltage at a current density of 0.3 A/cm$^2$ between Examples 1 to 5 and Comparative Examples 1 and 2, while the values in Examples 1 to 5 are equal to or more than those in Comparative Examples 1 and 2. Tables 1 and 2 indicate that after a lapse of 500 hours, the open-circuit voltage and the voltage at a current density of 0.3 A/cm$^2$ are higher in Examples 1 to 5 than in Comparative Examples 1 and 2. Tables 1 and 2 also indicate that the reduction rate of the open-circuit voltage and that of the voltage at a current density of 0.3 A/cm$^2$ are both less than 1% in Examples 1 to 5, while the reduction rates are significantly high in Comparative Examples 1 and 2. This indicates that degradation of the proton-conducting polymer membranes is suppressed in Examples 1 to 5 in contrast to the proton-conducting polymer membranes in Comparative Examples 1 and 2.

FIG. 1 is a graph showing the temperature dependence of the ion conductivity in Example 1 and Comparative Example 1. FIG. 1 indicates that even though the acid impregnation amount is less in the proton-conducting polymer membrane of Example 1 than in the proton-conducting polymer membrane of Comparative Example 1, both are substantially the same in ion conductivity, and thus the proton-conducting polymer membrane of the present invention has good ion conductivity.

Figure 2:
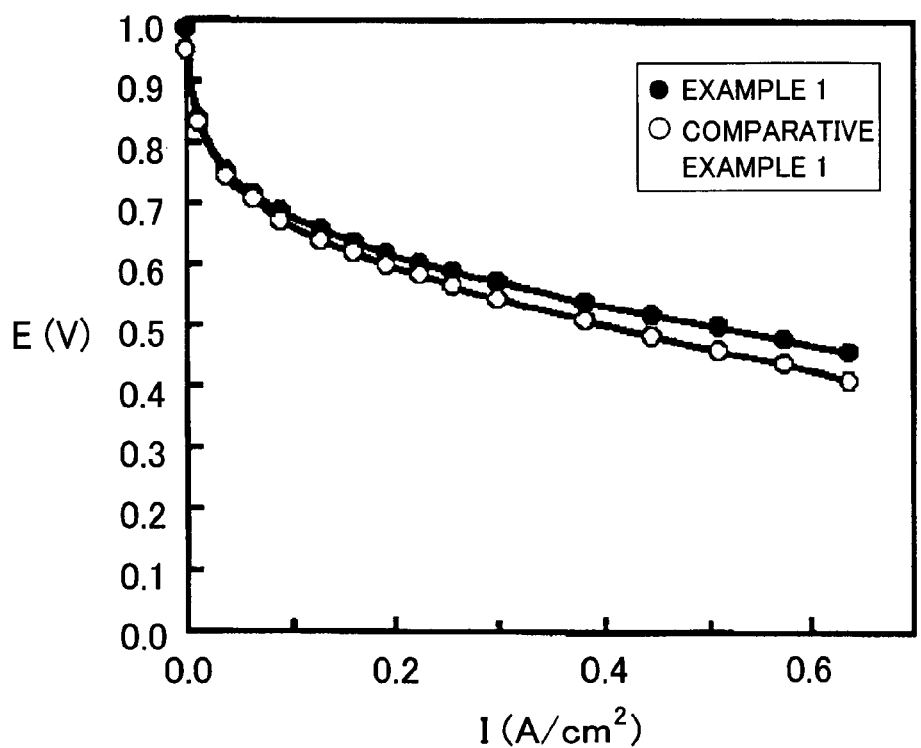
FIG. 2 is a graph showing the relationship between the current density and the cell voltage at the initial stage of the measurement in Example 1 and Comparative Example 1.

FIG. 2 is a graph showing the relationship between the current density and the cell voltage at the initial stage of the measurement in Example 1 and Comparative Example 1. FIG. 2 indicates that even though the acid impregnation amount is less in the proton-conducting polymer membrane of Example 1 than in the proton-conducting polymer membrane of Comparative Example 1, the power generation characteristics are slightly higher in Example 1, and thus the proton-conducting polymer membrane of the present invention produces good fuel cell characteristics.

FIG. 3 is a graph showing the relationship between the open-circuit voltage and the cell voltage at a current density of 0.3 A/cm$^2$ and the time of operation of the fuel cell in Example 1 and Comparative Example 1. FIG. 3 indicates that in Comparative Example 1, both the open-circuit voltage and the voltage at a current density of 0.3 A/cm$^2$ decrease as the operation time increases, while in Example 1, almost no reduction in these voltages is observed, and thus the fuel cell of the present invention has high durability.

The above indicates that the proton-conducting polymer membrane according to the present invention has good electrical properties and high durability.

Example 6

In a polymerization vessel were weighed 6.000 g (2.1557× 10$^{-2}$ mol) of 3,3′,4,4′-tetraaminodiphenylsulfone, 2.8821 g (1.7246×10$^{-2}$ mol) of 2,6-pyridinedicarboxylic acid, 1.0615 g (0.4311×10$^{-2}$ mol) of 3,5-dicarboxyphenylphosphonic acid (98% in purity), 36.86 g of polyphosphoric acid (with a phosphorus pentoxide content of 75%), and 29.54 g of phosphorus pentoxide. Under a stream of nitrogen, the mixture was heated to 100° C. with gentle stirring on an oil bath. After held at 100° C. for 1 hour, the mixture was heated to 150° C. and polymerized for 1 hour, and then heated to 200° C. and polymerized for 5 hours. After the polymerization was completed, the product was allowed to stand to cool. Water was added to the product, and the polymerization product was taken out and repeatedly washed with water in a home mixer until the pH became neutral on pH indicator paper. The resulting polymer was dried under reduced pressure at 80° C. overnight. The polymer showed a inherent viscosity of 1.66.

On an oil bath, 1 g of the resulting polymer was dissolved in 10 g of N-methyl-2-pyrrolidone (NMP). The solution was cast on a glass plate placed on a hot plate, and the NMP was removed by evaporation until a film was formed, and then the film was immersed in water at least overnight. The resulting film was immersed in dilute sulfuric acid (containing 6 ml of concentrated sulfuric acid and 300 ml of water) for at least one day and then further washed by immersing it in pure water several times so that a 21 μm-thick polymer membrane (named Polymer Membrane 5) was obtained.

Polymer Membrane 5 was immersed in vinylphosphonic acid (85% in purity, manufactured by Tokyo Chemical Industry Co., Ltd.) at 50° C. for 3 hours so that a vinylphosphonic acid-containing, proton-conducting, polybenzimidazole polymer membrane was obtained. At this time, the vinylphosphonic acid content calculated from the weight change was about 300% by weight, based on the weight of Polymer Membrane 5. Using the proton-conducting polybenzimidazole polymer membrane, the temperature dependence of the ion conductivity and the power generation characteristics of the fuel cell were measured by the same methods as in Example 1.

Table 3 shows the open-circuit voltages and the output voltages at a current density of 0.3 A/cm² at the initial stage of electric power generation and after a lapse of 500 hours.

TABLE 3

| | | Example 6 |
|---|---|---|
| Polymer Membrane | | Polymer Membrane 5 |
| Acid Type for Impregnation | | Vinylphosphonic Acid |
| Acid Impregnation Amount (wt %) | | 300 |
| Ion Conductivity (S/cm) (at 150° C.) | | $1.2 \times 10^{-2}$ |
| Power Generation Characteristics | Initial | Open-Circuit Voltage (V) | 0.969 |
| | | Voltage (V) (0.3 A/cm²) | 0.562 |
| | After 500 Hours | Open-Circuit Voltage (V) | 0.955 |
| | | Reduction Rate (%) | 1.4 |
| | | Voltage (V) (0.3 A/cm²) | 0.551 |
| | | Reduction Rate (%) | 2.0 |

Table 3 shows the ion conductivity at 150° C. with respect to the proton-conducting benzimidazole polymer membrane of Example 6. Concerning a fuel cell produced with the proton-conducting benzimidazole polymer membrane, Table 3 shows the initial open-circuit voltage, the open-circuit voltage after 500 hours, and the initial cell voltage and the cell voltage after 500 hours at a current density of 0.3 A/cm². Table 3 also shows the reduction rate (%) after 500 hours in the case that the initial voltage was normalized as 100%. The results shown in Tables 2 and 3 indicate that although in the initial state, no significant difference in open-circuit voltage is observed between Example 6 and Comparative Example 1 or 2, a slight difference in the voltage at a current density of 0.3 A/cm² is observed particularly between Example 6 and Comparative Example 1. It is also apparent that after a lapse of 500 hours, the voltage is significantly lower in Comparative Example 1 or 2 than in Example 6.

The above indicates that the proton-conducting benzimidazole polymer membrane of Example 6 has good electrical properties and high durability as compared with the proton-conducting polymer membrane of Comparative Example 1 or 2.

The embodiments and the examples disclosed herein are illustrative in all points and should not be construed to limit the present invention. The scope of the present invention is defined not by the foregoing description but by the claims and is intended to include all modifications within the meanings and scopes of the claims and equivalents.

INDUSTRIAL APPLICABILITY

According to the proton-conducting polymer membrane of the present invention, there is provided a novel proton-conducting polymer electrolyte membrane that is operable under high-temperature, non-humidified conditions, shows not only good proton conductivity but also good workability in a fuel cell assembling process, and exhibits sufficiently practical properties in terms of durability for fuel cells. Based on the above properties, the proton-conducting polymer membrane of the present invention can be used in a wide range of applications such as various cell electrolytes, sensors, capacitors, and electrolytic membranes, and contribute to industrial development and growth.

The invention claimed is:

1. A proton-conducting polymer membrane, comprising:

a polymer membrane comprising a polybenzimidazole compound having a sulfonic acid group and/or a phosphonic acid group; and vinylphosphonic acid contained in the polymer membrane;

wherein the mass of the vinylphosphonic acid contained in the polymer membrane is between 0.1 and 10 times the mass of the polybenzimidazole compound, and wherein said polybenzimidazole compound comprises a component that contains a sulfonic acid group and/or a phosphonic acid group and is represented by Structural Formula (1):

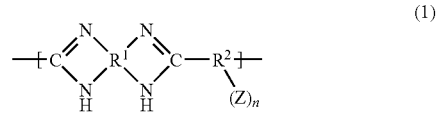

(1)

wherein n represents an integer of 1 to 4, R¹ represents a tetravalent aromatic linking unit capable of forming an imidazole ring, R² represents a bivalent aromatic linking unit, and Z represents a sulfonic acid group and/or a phosphonic acid group.

2. The proton-conducting polymer membrane according to claim 1, wherein said polybenzimidazole compound comprises a component that contains a sulfonic acid group and/or a phosphonic acid group and is represented by Structural Formula (2):

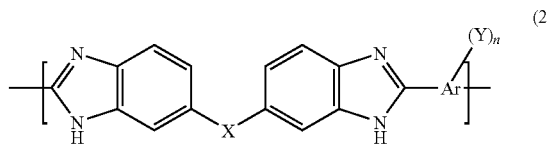

(2)

wherein X represents at least one linking structure selected from the group consisting of a direct bond, —O—, —SO$_2$—, —S—, —CO—, —C(CH$_3$)$_2$—, —C(CF$_3$)$_2$—, and —O-Ph-O—, Ar represents at least one linking structure selected from aromatic units, Ph represents an aromatic linking unit, Y represents at least one functional group selected from a sulfonic acid group and a phosphonic acid group and may be entirely in the form of an acid or may be entirely or partially in the form of a derivative, and n represents an integer of 1 to 4.

3. The proton-conducting polymer membrane according to claim 1, wherein said polybenzimidazole compound comprises a component represented by Structural Formula (3):

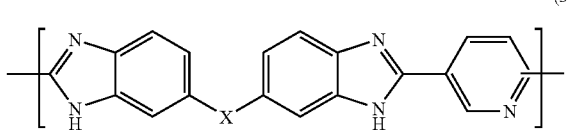

(3)

wherein X represents at least one linking structure selected from the group consisting of —O—, —SO$_2$—, —S—, —CO—, —C(CH$_3$)$_2$—, —C(CF$_3$)$_2$—, and —O-Ph-O—, and Ph represents at least one selected from ortho-phenylene, meta-phenylene and para-phenylene.

4. The proton-conducting polymer membrane according to claim 3, wherein the structure represented by Structural Formula (3) comprises, as a main component, a structure represented by Structural Formula (4):

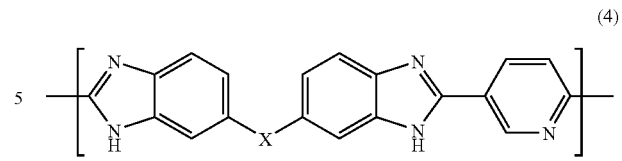

(4)

and/or
Structural Formula (5):

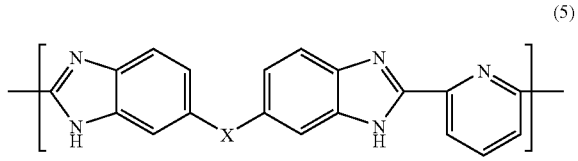

(5)

wherein X represents at least one linking structure selected from the group consisting of —O—, —SO$_2$—, —S—, —CO—, —C(CH$_3$)$_2$—, —C(CF$_3$)$_2$—, and —O-Ph-O—, and Ph represents at least one selected from ortho-phenylene, meta-phenylene and para-phenylene.

5. A method for producing the proton-conducting polymer membrane according to claim 1, comprising the step of immersing said polymer membrane in vinylphosphonic acid or in a solution containing vinylphosphonic acid.

6. A fuel cell, comprising:
a unit cell comprising an oxygen electrode, a fuel electrode, a solid polymer electrolyte membrane, an oxidant-feeding plate, and a fuel-feeding plate, wherein
said solid polymer electrolyte membrane is sandwiched between said oxygen electrode and said fuel electrode,
said oxidant-feeding plate is provided on an oxygen electrode side and forms an oxidant flow channel,
said fuel-feeding plate is provided on a fuel electrode side and forms a fuel flow channel, and
said solid polymer electrolyte membrane is the proton-conducting polymer membrane according to claim 1.

* * * * *